US010936558B2

(12) United States Patent
Patterson (10) Patent No.: US 10,936,558 B2
(45) Date of Patent: Mar. 2, 2021

(54) CONTENT-BASED DATA MIGRATION (71) Applicant: VMware, Inc., Palo Alto, CA (US)

(72) Inventor: R. Hugo Patterson, Los Altos, CA (US)

(73) Assignee: VMware, Inc., Palo Alto, CA (US)

( * ) Notice: Subject to any disclaimer, the term of this patent is extended or adjusted under 35 U.S.C. 154(b) by 159 days.

(21) Appl. No.: 16/295,290

(22) Filed: Mar. 7, 2019

(65) Prior Publication Data
US 2020/0285620 A1 Sep. 10, 2020

(51) Int. Cl.
*G06F 7/00* (2006.01)
*G06F 16/00* (2019.01)
*G06F 16/21* (2019.01)

(52) U.S. Cl.
CPC .................. *G06F 16/214* (2019.01)

(58) Field of Classification Search
None
See application file for complete search history.

(56) References Cited

U.S. PATENT DOCUMENTS

| 9,183,046 | B2 * | 11/2015 | Tsirkin | G06F 9/4856 |
| 9,600,493 | B1 * | 3/2017 | Hasegawa | G06F 3/067 |
| 10,673,679 | B2 * | 6/2020 | Zhu | H04W 36/0033 |
| 2008/0235300 | A1 * | 9/2008 | Nemoto | G06F 16/119 |
| 2009/0063556 | A1 * | 3/2009 | Nemoto | G06F 16/119 |
| 2009/0169012 | A1 * | 7/2009 | Smith | H04L 9/0836 380/277 |
| 2012/0030247 | A1 * | 2/2012 | Yambal | G06F 16/119 707/802 |
| 2015/0248403 | A1 * | 9/2015 | Pazdziora | G06F 16/211 707/809 |
| 2016/0041995 | A1 * | 2/2016 | Prinz, III | G06F 16/119 707/694 |
| 2017/0046143 | A1 * | 2/2017 | Kochhar | G06F 8/60 |
| 2018/0074748 | A1 * | 3/2018 | Makin | G06F 3/0604 |

* cited by examiner

*Primary Examiner* — Tuan A Pham
(74) *Attorney, Agent, or Firm* — Fish & Richardson P.C.

(57) ABSTRACT

Techniques are described for migrating namespace content from a source system to a target system. Migrating the namespace content involves copying data associated with a namespace from the source system to the target system in a manner that allows guests on both the source system and the target system to access the data during the namespace migration. Further the techniques take advantage of any replica of the namespace content that may already exist in target system, so that only blocks that are not already in the target system are copied as part of the migration operation. Both the source system and the target system use Content Addressable Storage, and have fingerprint indexes that allow blocks to be located based on their fingerprints. Thus, the target system to which a namespace is migrated may determine whether a desired block from the namespace can be obtained locally based on whether its fingerprint index has an entry for the fingerprint of the block.

32 Claims, 2 Drawing Sheets

CONTENT-BASED DATA MIGRATION

FIELD OF THE INVENTION

The present invention relates to migrating data, stored in a Content Addressable Storage (CAS) storage system, from a source system to a target system while keeping the data available to entities executing in both systems.

BACKGROUND

In contrast to conventional file systems, CAS systems allow applications to retrieve files from storage based on a hash values that are generated from the content of the files. Because CAS systems perform storage-related operations on files based on the hash values generated for the files based on the content rather than where the files are stored, the applications that request the operations may do so without knowing the number or location of the stored copies of the files.

For example, a CAS system may store multiple copies of file X at locations A, B and C. An application that desires to retrieve file X would do so by sending to the CAS system a hash value that is based on the contents of file X. Based on that hash value, the CAS system would provide to the application a copy of file X retrieved from one of the locations A, B, and C. Thus, the application would obtain file X without knowing where file X was actually stored, how many copies of file X existed, or the specific location from which the retrieved copy was actually obtained.

Content Handle

In a CAS system, the hash value used to retrieve a file is referred to as the "content handle" of the file. The content handle of a file X may be derived by: (a) generating a first-level hash value for each block that contains data for the file X, (b) storing those first-level hash values in one or more blocks ("second-level" blocks), (c) generating a second-level hash value for each of those second-level blocks, (d) storing those second-level hash values in a block (a "third-level block), and (e) generating a third-level hash value for the third-level block.

That third-level hash value serves as the content handle for the file X. Specifically, the third-level hash value may be used to retrieve the third block. The second-level hash values in the third-level block may be used to retrieve the second-level blocks. The first-level hash values in the second-level blocks may be used to retrieve the blocks that store the actual data for file X.

In the example given above, there are three levels of blocks: the first-level blocks that store the data for a file, the second-level blocks that store hash values (fingerprints) of the first-level blocks, and the third-level block that stores the hash values for the second-level blocks. However, the actual number of levels may vary from file to file and from implementation to implementation. For example, if the hash values for the first-level blocks all fit in a single second-level block, then the hash value for that second-level block may be used as the content handle.

Because the content handle of a file is based on the content of the file, the content handle changes every time the content of the file itself changes. Specifically, if content of a first-level block of file X changes, the first-level hash value for that first-level block changes. The second-level block that contains the first-level hash value for that block would also have to be updated. The update to that second-level block causes the second-level hash value for that second-level block to change. The third-level block that contains the second-level hash value for that second-level block would have to be updated. The update to the third-level block causes the third-level hash value (which is the content handle to file X) to change.

Namespace Structure

The term "namespace structure", as used herein, refers to a data structure that maps file names to content handles. Thus, logically, a namespace structure has the form:

| NAMESPACE STRUCTURE | |
| --- | --- |
| FILE NAME | CONTENT HANDLE |
| Filename1 | ContentHandle1 |
| Filename2 | ContentHandle2 |
| Filename3 | ContentHandle3 |
| ... | ... |

As explained above, any change in the content of a file causes the content handle of the file to change. Thus, every time a file is updated, the content handle must be updated in the namespace structure entry for that file. For example, when the content of file "Filename2" is changed, a new content handle for "Filename2" is computed, and the namespace structure entry for "Filename2" is updated as illustrated below:

| NAMESPACE STRUCTURE | |
| --- | --- |
| FILE NAME | CONTENT HANDLE |
| Filename1 | ContentHandle1 |
| Filename2 | ~~ContentHandle2~~ NewContentHandle |
| Filename3 | ContentHandle3 |
| ... | ... |

The namespace structure itself may be stored in content addressable storage in the same manner as a file. Specifically, hash values (fingerprints) may be computed for the blocks that store the namespace structure information, and those fingerprints may be used to derive a content handle for the namespace structure. The content handle for a namespace structure is referred to herein as a "namespace-CH".

As with other types of files, the number of levels between the first-level data blocks that contain the namespace structure and the "namespace-CH" may vary based on a variety of factors, including the size of the namespace structure and the size of the data blocks. The software module that maintains the namespace structure is referred to herein as the namespace structure manager.

Namespace Content

As used herein, the term "namespace content" refers to the namespace structure and all data referenced in the namespace structure. Thus, the namespace content includes the data blocks of the namespace structure, the data blocks of all files identified in the namespace structure, and the intermediate blocks that are used to store the content handles used to access those data blocks.

A change in the content of any file listed in a namespace structure (e.g. Filename2) causes a change to the namespace-CH of the namespace structure because (a) any change to the content of Filename2 causes the content handle of Filename2 to change, (b) the change to the content handle of Filename2 causes an update to the namespace structure entry for Filename2, (c) the namespace structure entry change causes a change to the content of the namespace structure, and (d) the namespace-CH of the namespace structure changes with any change in the content of the namespace structure.

Fingerprint Index

The storage on which blocks of data are stored by a CAS system is collectively referred to as a "data pool". The data structure used to determine that actual locations of the data blocks of a file, within the data pool, based on the content handle of the file is referred to herein as a "fingerprint index".

The fingerprint index maps fingerprints for blocks or content handles to "location information". The location information is information that is used by the storage system that implements the data pool to determine where the data actually resides. The nature of the location information may vary from storage system to storage system. For example, the location information may be in the form of logical block addresses (LBAs), object identifiers, etc. The techniques described herein are not limited to any particular type of storage system nor any particular type of location information.

Example Operations

A typical file retrieval operation in a CAS system may proceed as follows:
 a host provides the namespace structure manager a file name of a target file
 based on the file name, the namespace structure manager uses the namespace structure to determine the content handle of the target file
 based on the content handle, the host uses the fingerprint index to determine the location information of the highest-level block of the target file
 the host, directly or indirectly, uses the location information to retrieve the target file If the host updates the target file, then a new content handle is generated (as described above), and the new content handle is provided to the namespace structure manager. The namespace structure manager updates the namespace structure to reflect the new content handle.

If, at any point in this process, a content handle is encountered for which the fingerprint index has no location information, then the file system may be corrupted.

Data Centers and Replication

A data center may include numerous independently operating systems. Each such system may have its own respective namespace structure and file system. Often, such systems are implemented such that failure of one system does not adversely affect the operation of the other systems.

To minimize the negative impact of a failure, data from one system may be replicated to another system. The inter-system replication of data may be performed synchronously or asynchronously. Whether the replication is synchronous or asynchronous has a significant effect on the performance of the systems and the impact of a system failure.

Synchronized Replication

To ensure that data of one system remains available when the system fails, it is possible to keep the content of two or more systems in sync. When the data of two or more CAS systems are kept in sync, the content in their file systems (including the namespace structure, the filenames, the content handles, etc.) is identical. Consequently, read requests may be directed to any of the systems. However, in order to keep all systems synchronized, all write requests must be issued to and performed in all of the systems.

When systems are synchronized in this manner, the failure of any system does not reduce the availability of the data, since any of the remaining systems can provide the data. Unfortunately, the cost of such high availability is often a significant reduction in performance. Specifically, as mentioned above, each write operation must be performed across all systems. One of the synchronized systems may be remote and/or have inferior connectivity. Any such low-performance system would reduce the performance of the entire system.

Another problem with synchronized systems is that after a failed node is restored, the restored node must be re-synced with the nodes. Such re-sync operations may consume a significant amount of resources, particularly if the failed node was offline for a long period of time.

Asynchronous Replication

Rather than attempt to synchronize multiple systems, it is possible to asynchronously replicate data between systems. In asynchronous replication, changes are immediately performed at one system (a primary system) and later copied to one or more other systems (secondary systems). Asynchronous replication avoids the performance issues of synchronization. However, with asynchronous replication, not all systems reflect the most recent changes.

For example, assume that namespace content NS1 in a source system X is to be asynchronously replicated to a target system Y. Initially, a snapshot of the namespace content NS1 can be taken, and all data that belongs to the snapshot can be copied to system Y. In a CAS system, the namespace-CH of the namespace may serve as the snapshot. Thus, the namespace-CH of NS1 may be copied at a particular point in time T1, and all blocks referenced directly or indirectly through that copy of the namespace-CH may then be copied to target system Y. Once all of the directly and indirectly referenced blocks have been copied, target system Y will have a replica of all the namespace content NS1 as of time T1.

Unfortunately, unless the source system X was taken offline during the replication operation, this snapshot of the namespace content NS1 would not be a mirrored or identical backup of the current namespace content NS1 in system X, because creation of the replica does not happen instantaneously. During the replication operation itself, changes to the namespace content NS1 in the source system X continue to occur. Consequently, by the time the replica is created in target system Y (e.g. time T2), the replica (which reflects time T1) is stale. Specifically, the changes that occurred in the namespace content NS1 in system X after time T1 are not reflected in the replica. In addition, after the replica is created, the replica becomes further out of date as new changes are made to namespace content NS1 at the source system X.

Migrating a Guest Application

In some cases, it is desirable to migrate a guest application, such as a virtual machine, from one system (the "source system") to another system (the "target system"). When the source system and the target system are kept in sync, such migration can occur without significantly affecting the performance of the guest application, because up-to-date versions of all data required by the guest application is already available at the target system. However, synchronization incurs the performance problems discussed above.

Techniques have been developed to migrate guest applications to the hosts of systems that do not initially have the data that the guest applications need. Such techniques are described, for example, in U.S. patent application Ser. No. 15/960,841, filed on Apr. 24, 2018, and U.S. patent application Ser. No. 15/956,283, filed on Apr. 18, 2018, the entire contents of both of which are incorporated herein by this reference.

Unfortunately, when the target system already has an out-of-date replica of namespace content used by a guest application, any guest migration technique that copies all of the namespace content from the source system to the target system is wasteful. For example, assume that a guest G1 is migrating from a host on system X to a host on system Y. Assume further that, within system X, guest G1 stores its data in namespace NS1, and that system Y includes a recently-made replica of namespace content NS1. Depending on how many changes occurred in namespace content NS1 after the snapshot of the replica, system Y may already have 90% of the current blocks of namespace content NS1. Copying the entirety of namespace content NS1 to system Y when system Y already has 90% of namespace content NS1 is inefficient. Further, copying any significant amount of data can take time, which may unacceptably delay the migration. Running workloads are often intolerant of delays longer than a few seconds and report errors when delays exceed a threshold. Thus, such delays can make it impossible to migrate a workload without errors.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided migrating namespace content from a source system to a target system. Migrating the namespace content involves copying data associated with a namespace from the source system to the target system in a manner that allows guests on both the source system and the target system to access the data during the namespace migration. Further the techniques take advantage of any replica of the namespace content that may already exist in target system, so that only blocks that are not already in the target system are copied as part of the migration operation. And the techniques avoid significant delays that can lead guests on either or both systems to report errors.

According to one embodiment, the namespace migration occurs in phases. Prior to the first phase, all guests (regardless of the system to which their host belongs) that require access to files in a namespace interact with the source system, that serves as the "home" of the namespace. After the final phase, all guests (regardless of the system to which their host belongs) that require access to files in the namespace interact with the target system, which serves as the new "home" for the namespace structure. The various intermediate phases shall be described in greater detail hereafter.

Example CAS System

The namespace migration techniques described herein involve the migration of a namespace structure (and all the data associated therewith) from a source system that uses content addressable storage to a target system that uses content addressable storage. Because both source and target systems use content addressable storage, both systems use the "fingerprint" of blocks as the means for accessing the blocks.

Figure 1:
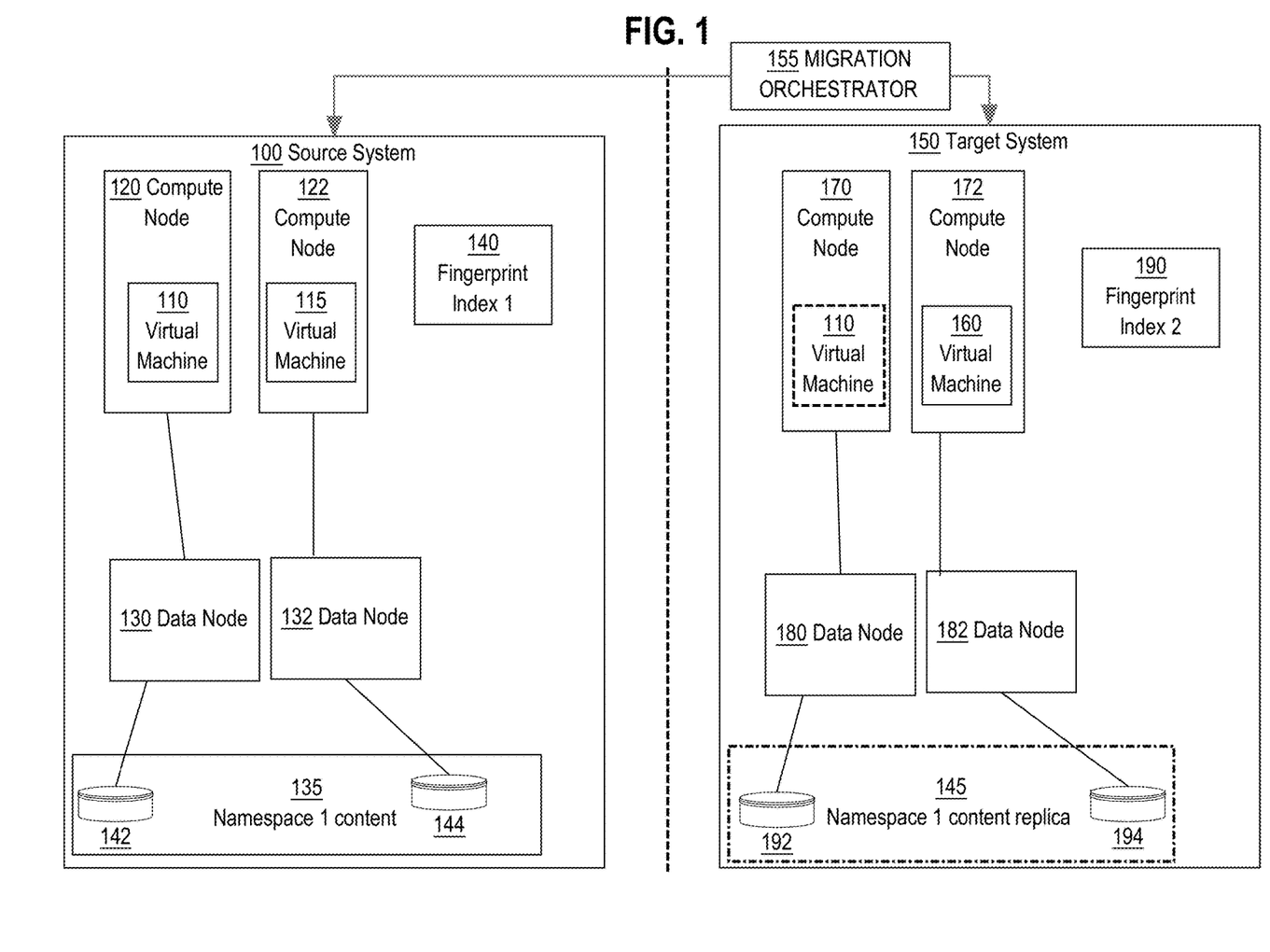
FIG. 1 is a block diagram that illustrates a target system and a source system, according to an embodiment.

FIG. 1 depicts an example embodiment of a distributed storage system including two CAS storage systems 100 and 150. Each of storage systems 100 and 150 has a set of compute nodes configured to run and manage multiple guest applications (e.g. virtual machines), and a set of data nodes configured to store the data used by the guest applications.

Source system 100 and target system 150 are storage systems containing multiple compute nodes 120-122, 170-172 and multiple data nodes 130-132, 180-182. Source system 100 is initially configured as the "home" system for a namespace structure 1 (135). For the purpose of explanation, it shall be assumed that compute nodes 120-122 are running one or more virtual machines 110-115 that store data in association with namespace 1.

For the purpose of illustration, it shall be assumed that the target system 150 is initially configured as a backup system to the source system 100. While the source system 100 is under maintenance or the source system 100 fails due to system errors, the target system 150 is configured to work as a backup system. The target system 150 contains compute nodes 170-172 and data nodes 180-182. Because target system 150 is serving as a backup to source system 100, data nodes 180-182 store a replica of namespace 1 content. Because replica 145 is not maintained in sync with namespace structure 1 on source system 100, namespace 1 content in system 400 contains blocks that are not reflected in replica 145.

While compute nodes within the source system 100 and the target system 150 may have the same functionality, for the purpose of differentiating compute nodes on the source system 100 and the target system 150, the compute nodes in the source system 100 are referred to herein as "source compute nodes" 120-122 and the compute nodes in the target system 150 are referred to herein as "target compute nodes" 170-172.

In one embodiment, source compute nodes 120-122 and target compute nodes 170-172 are servers configured to execute virtual machine instances, cache data from one or more virtual machines within internal storage, send and receive data from one or more data nodes, generate snapshot backups of virtual machine data, replicate snapshot backups to another system, and execute scheduling processes configured to schedule the snapshot backups of virtual machine data and schedule the replication of the snapshot backups to another system.

Source compute nodes 120-122 are configured to generate snapshot backups of all data associated with namespace 1 and replicate the snapshot backups to the target system 150. Target compute nodes 170-172 are configured to receive and store the snapshot backups from the source compute nodes 120-122. The snapshots can be stored in a snapshot repository (i.e., snapshot store).

In an embodiment, each of source compute nodes 120-122 and target compute nodes 170-172 contains one or more processors configured to execute the virtual machines 110, 115, 160 and handle the IO requested by the virtual machines 110, 115, 160. In one embodiment, the source compute nodes 120-122 and target compute nodes 170-172 contain a local cache implemented on a flash memory storage medium that is configured to maintain copies of virtual machine data. The source compute nodes 120-122 and target compute nodes 170-172 are also configured with network devices and communication protocols that enable communication between other source compute nodes, and data nodes within source system 100 and target system 150. In other embodiments, source compute nodes 120-122 and target compute nodes 170-172 may implement local caches on various other types of storage mediums.

In an embodiment, virtual machines 110, 115, and 160 represent implementations of virtual computer environments including, but not limited to, virtual system machines that provide functionality for executing entire operating systems and process virtual machines that are configured to execute computer programs in a specific platform or a platform-independent environment.

Virtual machines (guests) 110, 115, and 160 run on at least one of source compute nodes 120-122 or target compute nodes 170-172, which provide the hardware resources, such as CPU and memory, to run implementations of the virtual machines 110, 115, and 160. In target system 150, virtual machine 110 is depicted with a dotted-lined border. This depiction of virtual machine 110 represents that virtual machine 110 is migrated from the source system 100 to the target system 150. In some embodiments, the virtual machine 160 (second virtual machine) can be separately added to the target system 150 with a host as a spare server to support additional workload performed at another system.

In an embodiment, data nodes 130-132, 180, and 182 represent storage servers configured to maintain persistent copies of virtual machine data and configured to communicate with source compute nodes 120-122, target compute nodes 170-172, and storage devices 142-144, 192-194. While data nodes 130-132, 180-182 store compressed and de-duplicated data, compression and deduplication tasks are performed on the source compute nodes. In an embodiment, storage devices 142-144, 192-194 may represent storage devices configured with different types of storage mediums to store virtual machine data persistently.

Global Namespace Directory

According to one embodiment, to facilitate namespace migration between systems, a global namespace directory is used to keep track of the current "home" of each of the namespaces used in the storage systems. While FIG. 1 illustrates only two systems and only one namespace, there may be any number of systems serviced by a namespace directory, and each of those systems may have any number of namespaces.

At any point in time, each namespace has a single "home" system. The global namespace directory maintains a listing of namespaces and their current "home" systems. When a guest in any system requests to "mount" a particular namespace, the host on which the guest is executing sends a request to the global namespace directory to determine the current home of the namespace. The global namespace directory responds with information about the home system.

For example, upon receiving a request to locate namespace 1, the global namespace directory would respond with information to indicate that the current home of namespace 1 is source system 100. For example, <namespace-dir/namespace-id> command can be issued to locate a particular namespace. In this command, "namespace-dir" identifies the global namespace directory (e.g. an IP address of the global namespace directory service). In the command, "namespace-id" is the identifier of a particular namespace.

Remote Access to Namespace Content

The guest that mounts a namespace need not be running on a host of the system that is the current home of the namespace. When the guest is not running on the system that is the home to the namespace it is using, the guest's I/O requests may be forwarded directly or indirectly to the home system of the namespace. The exact mechanism for forwarding the I/O requests of remote guests may vary from implementation to implementation, and the techniques described herein are not limited to any particular mechanism for forwarding such requests. Such requests are referred to herein as "remote" requests. Because the requests are remote, the responses will typically take longer than if the requests were local.

In one embodiment, the protocol of the remote accesses is similar to that of local accesses. For example, the home system's namespace structure is used to obtain the content handle(s) of a file and fingerprint(s) of block(s) that comprise a file, then the home system's fingerprint index is used to determine the actual location, within the home system, of those blocks. Finally, the blocks that comprise the file are retrieved and delivered to the host on which the guest application is executing.

Multi-Phase Namespace Migration

Techniques are provided for migrating a namespace, including both the namespace structure and the namespace content, from a source system to a target system without significantly interrupting operation of any guest applications that are storing data in and reading data from the namespace that is being migrated.

According to one embodiment, the namespace migration is performed in several phases, including a pre-migration phase, a home-change phase, and a post-migration phase. How I/O requests from guests are handled changes from phase to phase, based on where the guests are executing. Each of these phases shall be described hereafter in greater detail.

The Pre-Migration Phase

Initially, in a "pre-migration phase", guest applications read and write to the namespace as illustrated in the following Table 1.

TABLE 1

| Action | GUEST IN SOURCE SYSTEM | GUEST IN TARGET SYSTEM |
| --- | --- | --- |
| Read operation | Use namespace-CH of source system. Obtain blocks from source system. | Use namespace-CH of source system. Attempt to obtain blocks from target system using target system's fingerprint index. If block found, obtain block from target system. If block not found, obtain block from source system. |
| Write operation | Write blocks to source system (causing updates to the namespace structure of source system and the fingerprint index of the source system). | Write blocks to source system (causing updates to the namespace structure of source system and the fingerprint index of the source system). |

As illustrated by the table above, in the pre-migration phase, guests in the source system use the source system to perform all I/O with the namespace. In contrast, guests in the target system first attempt to retrieve each block in the target system. If the block is found in the target system, the block is retrieved from the target system. In situations where the target system includes a recent replica of namespace's content, a high percentage of the blocks needed by a guest in the target system may already be present in the target system.

If a needed block is not found in the target system, the I/O request from the guest in the target system is forwarded to the source system. In response, the source system provides the requested block. Upon receipt of the block, the target system provides the block to the guest application. Optionally, the target system also stores the block within the target system. Upon storing the block, the target system updates its fingerprint index to include a mapping between the fingerprint of the block and location information about where the block is stored within the target system.

In an embodiment that implements the protocol illustrated in Table 1, all blocks required by a guest application of the target system are first searched for in the target system. However, in alternative embodiments, metadata blocks (e.g. blocks that belong to the namespace structure) are requested from the source system without first checking whether the blocks are already present in the target system. This approach may be desirable for example, because it is less likely that any replica of the namespace that was stored in the target system will include the current metadata blocks.

Anticipatory Guest Application Migration

Initially, all guest applications that make use of a namespace may reside in the home system of the namespace. However, it may be determined that both the namespace, and some or all of the guests that use the namespace, should be migrated to the target system. Such migration may be desirable, for example, if the source system needs maintenance. Under these conditions, one or more of the guest applications may be migrated to the target system. Various techniques are available for migrating the guests. Some techniques, such as such as VMware vMotion, allow the guests to be migrated without restarting the guests. This means that the services the guests provide are continuously available throughout the migration, which is much less disruptive than having to restart the guests on the target system. To support the migration of guests without restarting the guests, the techniques described herein make the namespace available continuously throughout the migration, with only the briefest of outages for cutover. Any guest applications that are migrated to the target system in anticipation of a namespace migration initially operate as described above.

In some situations (not shown), a compute node may belong to both source system 100 and target system 150. In such situations, guest applications on a compute node that belongs to both systems may not need to be migrated to a different compute node during a namespace migration operation. However, the source pool may still need to go down for maintenance and the namespace would still need to be migrated from the source system to the target system, as described in greater detail hereafter.

To facilitate the execution of such migrated guests, new host devices may be added to the target system, or the target system may include extra host devices whose purpose is to execute guests that are migrated from other systems (e.g. during maintenance operations).

Home-Change Phase of Migration

The pre-migration phase is followed by a home-change phase. During the home-change phase of namespace migration, the namespace-CH of the to-be-migrated namespace is communicated to the target system, and the namespace directory is updated to indicate that the home of the namespace is now the target system. In addition, the processes required to host the namespace begin executing on the target system.

Once the namespace-CH has been communicated to the target system, the guests in both the source system and the target system use the namespace-CH maintained by the target system to access files that belong to the migrated namespace.

The performance of operations during the home-change phase of migration is illustrated in the following Table 2:

| Action | GUEST IN SOURCE SYSTEM | GUEST IN TARGET SYSTEM |
|---|---|---|
| Read operation | Use namespace-CH of target system. Attempt to obtain blocks from source system using source system's fingerprint index. If block found, obtain block from source system. If block not found, obtain block from target system. | Use namespace-CH of target system. Attempt to obtain blocks from target system using target system's fingerprint index. If block found, obtain block from target system. If block not found, obtain block from source system. |
| Write operation | Write blocks to target system (causing updates to the namespace structure of target system and the fingerprint index of the target system). | Write blocks to target system (causing updates to the namespace structure of target system and the fingerprint index of the target system). |

As illustrated in Table 2, during the home-change phase, the read requests of guest applications in the target system are handled in a manner similar to the pre-migration phase. That is, guest applications in the target system first look for blocks locally (in the target system), and if the blocks are not found, then the blocks are requested from the source system. However, during the home-change phase, the search for a block begins with the namespace-CH for the namespace that is now maintained at the target system.

During the home-change phase, read requests from guests in the source system are handled in a manner similar to the guests in the target system. Specifically, guests in the source system start with the namespace-CH from the target system, and first attempt to retrieve each block in the source system. If the block is found in the source system, the block is retrieved from the source system.

If the needed block is not found in the source system, the I/O request from the guest in the source system is forwarded to the target system. In response, the target system provides the requested block. Upon receipt of the block, the source system provides the block to the guest application but does not store the block within the target system.

In an alternative embodiment, for guests on the source system, metadata blocks (e.g. blocks that belong to the namespace structure) are requested from the target system without first checking whether the blocks are present in the source system. In such an embodiment, when a guest on the source system needs a block, the source system is only checked for blocks that do not belong to the namespace structure.

Referring again to FIG. 1, during the home-change phase of migrating namespace 1, for read operations of both virtual machine 115 (which resides in the source system) and virtual machine 160 (which resides in the target system), the namespace-CH in the target system 150 is used to access the namespace structure of namespace 1.

Because target system 150 initially only contains an out-of-date replica 145 of namespace 1, target system 150 may encounter a situation in which a required block does not reside in target system 150. The required block (which may belong to the namespace structure itself or to namespace content), is then requested from the source system.

When the remote system provides the requested block, the block is stored within the target system 150, and the fingerprint index within target system 150 is updated to map the fingerprint of the block to the location of the block with system 150.

During the home-change phase, all write operations are directed to the target system.

Completing the Namespace Content Migration

During the home-change phase, not only may guest applications on the target system be retrieving blocks from the source system, but the target system itself may be iteratively pulling blocks that belong to the migrating namespace into the target system. Specifically, the target system may execute one or more processes that pull all blocks referenced by the namespace-CH as it existed at the time of the namespace home changed, into the target system.

The namespace-CH, as it existed at the time of the namespace home change, is referred to herein as the "migration snapshot". Since all changes made in the namespace after the namespace home change are made in the target system, the target system is guaranteed to include the entire namespace content once all blocks referenced in the migration snapshot are pulled into the target system.

As the target system iterates through all references in the namespace-CH, it may be that only a small subset of the blocks in the namespace content need to actually be requested from the source system. Specifically, the target system need not request any block that is already in the target system, including (a) blocks contained in the replica, of the namespace, that already existed in the target system and (b) blocks that have already been pulled into the target system in response to I/O requests made by guest applications in the target system.

Once the target system has finished iterating through the blocks referenced (directly or indirectly) by the migration snapshot, the target system will have the blocks for the current versions of all files in the namespace. At this point, the home-change phase ends, and the post-migration phase begins.

Post-Migration Phase of Namespace Migration

The post-migration phase begins when the target system confirms that all blocks referenced in the migration snapshot have been stored in the target system. Prior to the post-migration phase, the source system retains the blocks that belong to that migration snapshot. Once the post-migration phase begins, the source system need not retain any blocks from the migrated namespace. Thus, those blocks may be deallocated. On the other hand, those blocks may be retained as a replica of the namespace. If the blocks are retained as a replica, the blocks will not have to be transferred back to the source system if the namespace is ever migrated back to the source system from the target system.

Table 3 indicates how I/O requests from guests are handled during the post-migration phase:

TABLE 3

| Action | GUEST IN SOURCE SYSTEM | GUEST IN TARGET SYSTEM |
| --- | --- | --- |
| Read operation | Use namespace-CH of target system. Attempt to obtain blocks from source system using source system's fingerprint index. If block found, obtain block from source system. If block not found, obtain block from target system. | Use namespace-CH of target system. Obtain blocks from target system. |
| Write operation | Write blocks to target system (causing updates to the namespace structure of target system and the fingerprint index of the target system). | Write blocks to target system (causing updates to the namespace structure of target system and the fingerprint index of the target system). |

Table 3 reflects an embodiment in which guests from the source system continue to attempt to retrieve blocks locally. It may be efficient to do so in cases in which the source system retains a replica of the now-transferred namespace. However, in an embodiment that deallocates blocks at the source after migration has been completed, it may be desirable for the guests to simply initiate a remote I/O with the target system without first attempting to retrieve the block locally at the source system.

Even when a replica is retained at the source system, that replica will become more and more stale over time. Consequently, it may be desirable that, at some point after the namespace migration has been completed, for the guest I/O at the source system to cease checking the source system before requesting blocks from the target system. The trigger that causes the source system to cease making local checks for data from an already-transferred namespace may vary from implementation to implementation, and may include the passage of a certain amount of time, or the number of post-migration updates exceeding a certain threshold.

Communicating Namespace Migrations

Once a namespace has been migrated from a source system to a target system, the source system is no longer used to service requests for data that belong to the namespace. If any guest attempts to use the source system to obtain data from a namespace that has moved, the source system indicates that the namespace is not the home for the namespace. When this occurs, the system that issued the request communicates with the namespace directory to find out the current home of the namespace. The namespace directory responds with a message indicating the current home of the directory, and the I/O request is then sent to the indicated system.

In alternative embodiments, the fact that a namespace has been migrated may be pushed to each of the systems. In such an embodiment, each system may maintain a local namespace-to-system mapping that is updated in response to such pushed messages.

Taking Advantage of Existing Namespace Replicas

The namespace migration techniques described above takes advantage of the fact that the target namespace may already have a replica of the to-be-migrated namespace.

Specifically, the blocks belonging to the replica need not be transferred to the target namespace again as part of the namespace migration. Thus, if the target system has a recent replica, the transfer of a large percentage of the namespace content need not be transferred to the target system as part of the namespace migration.

In addition to avoiding the need to transfer much of the namespace content during a namespace migration, the existence of a replica at the target system further allows guest applications running in the target system to immediately take advantage of the improved retrieval operations for the blocks that belong to the replica. Specifically, the guest applications in the target system may immediately retrieve those blocks locally from the target system's storage, rather than having to remotely request the blocks from the source system.

Do-not-Migrate Files

According to an embodiment, a user may designate one or more files within the namespace as "do-not-migrate" files. The files thus designated may be marked, for example, by a flag in the namespace entry of the files within the namespace structure. A file may be designated a do-not-migrate file for a variety of reasons, including the file being outdated or temporary.

After the namespace-CH is transferred to a target system as part of the namespace transfer, that target system reconstructs the namespace structure of the namespace. The reconstructed namespace structure will include the "do-not-migrate" designations. When iteratively pulling blocks into the target system during the home-change phase, the target system skips those files that have do-not-migrate designations. After the migration of the namespace, any guest application that references those files will receive an error indication.

Maintenance Example

The namespace migration techniques described herein are useful in a variety of scenarios. Once such scenario is a scenario in which the source system needs to be taken down for maintenance. If the maintenance is for a relatively short time, it is possible that only a subset of guests that use the namespace will need to be active during the maintenance period. When such is the case, the subset of guests that need to remain active may be migrated to the target system, and all files associated with the remaining guests may be marked as "do-not-migrate".

According to one embodiment, the migration is performed automatically by a migration orchestrator, which may belong to one of the systems involved in the migration or may be external to both systems. In FIG. 1, a migration orchestrator 155 is depicted external to both source system 100 and target system 150. In one embodiment, the migration orchestrator 155 automates the migration of the namespace and each of the guests from the source system 100 to the target system 150. The administrator can simply indicate that the source system 100 needs to be put in maintenance mode with the target system 150 taking over, and the migration orchestrator 155 takes care of the individual steps in an automated fashion.

In an embodiment that uses a migration orchestrator, a single command to the migration orchestrator could put the source system into maintenance mode, where the orchestrator automatically performs the steps including some or all of: adding hosts to the target, updating the replica with recent data, migrating some guests in sequence or a few at a time, migrating the namespace, migrating remaining guests, and/or shutting down the source system. Further, the migration orchestrator can also automate the reverse operation, to put the original source back in service after maintenance.

Because only those files that are associated with the migrated guests need to be available in the target system during the migration process, the time required to finish the home-change phase of namespace migration is significantly reduced. Once the home-change phase of namespace migration is finished, the hosts of the source system may be taken offline for maintenance.

Once maintenance is over, the hosts of the target system may come online, and the namespace may be migrated back to the source system. The home-change phase of the migration back to the source system is also relatively fast, because (a) the source system already has the namespace content as it existed at the time of the first migration, and (b) only a subset of guests made changes in the namespace during the maintenance period. Further, once the namespace is migrated back to the source system, the "do-not-migrate" indicates may be cleared, and those files (and their corresponding blocks) are once again available in the source system.

Failure/Recovery Example

The namespace migration techniques described herein may also be useful in situations where a system fails. For example, assume that a system A that is the home of a namespace X fails. Prior to the failure, a replica of the namespace content of namespace X may have been copied to another system B. Under these circumstances, guests that were executing on system A may be restarted on system B. This restart of the guests would entail a brief outage while the guests are restarted.

To allow the restarted guests on system B to access the data contained in the replica, a new namespace Y may be initiated on system B. The new namespace Y may be populated with the data from the most recent replica of the namespace X. If system B does not have a synchronous replica of system A, the guests are restarted from the most recent version of the data that B has available.

Once system A is recovered, those guests and the new namespace Y may be migrated from system B back to system A. Using the above migration techniques, the guests can be migrated back to system A without down time and without having to transfer most of the blocks. Once migrated to system A, content handles for files that existed in namespace X, but not in the replica, can be added to the namespace structure of namespace Y so that the guests can access that data through namespace Y.

Spare Hosts

To allow namespace migration to a target system without negatively impacting the performance of the target system, one or more systems may be designed with "spare hosts". Similar to other host devices, spare hosts include one or more processors capable of executing guest applications. However, the computational bandwidth of spare hosts is generally reserved until a namespace is to be migrated to the system. When a namespace is migrated to a system, the guests that access the data in the namespace are migrated to the spare hosts of the system.

For example, assume that systems A and B each have ten hosts, and that system A is the home of namespace X and system B is the home of namespace Y. Under these circumstances, eight of the hosts of system A may execute the guests that use namespace X, and eight of the hosts of system B may execute the guests that use namespace Y. If namespace X ever has to be migrated to system B, the guests that access namespace X can be migrated to the two hosts of system B that are not executing guests that use namespace Y. Similarly, if namespace Y ever has to be migrated to system A, the guests that access namespace Y can be migrated to the two hosts of system A that are not executing guests that use namespace X.

In one embodiment, spare hosts are not initially assigned to any system. In such situations, the spare hosts may be automatically added to any system to which a namespace is to be migrated. In a system that incorporates a migration orchestrator, the automatic addition of spare hosts may be performed by the migration orchestrator. The selected system may be, for example, the system that contains the most recent replica of the namespace that is to be migrated. For example, systems A and B may each include eight hosts, and two hosts may be unassigned. System A may have a replica of namespace Y, while system B has a replica of namespace X. If namespace X is to be migrated to system B, the two spare hosts may be automatically assigned to system B for the purpose of running the guests that access namespace X. Similarly, if namespace Y is to be migrated to system A, the two spare hosts may be automatically assigned to system A for the purpose of running guests that access the namespace Y.

When a spare host has been added to a system B in response to the migration of a namespace to system B from system A, the spare host may be automatically removed from system B in response to the namespace been migrated back to system A. For example, in response to namespace X being migrated to system B, one or more spare host devices may be automatically assigned to system B, and guests that use namespace X may be migrated to those spare hosts. In response to namespace X being moved back to system A (e.g. after maintenance of system A is finished), the guests that use namespace X may be migrated back to system A, and the spare hosts can be automatically removed from system A.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 2:
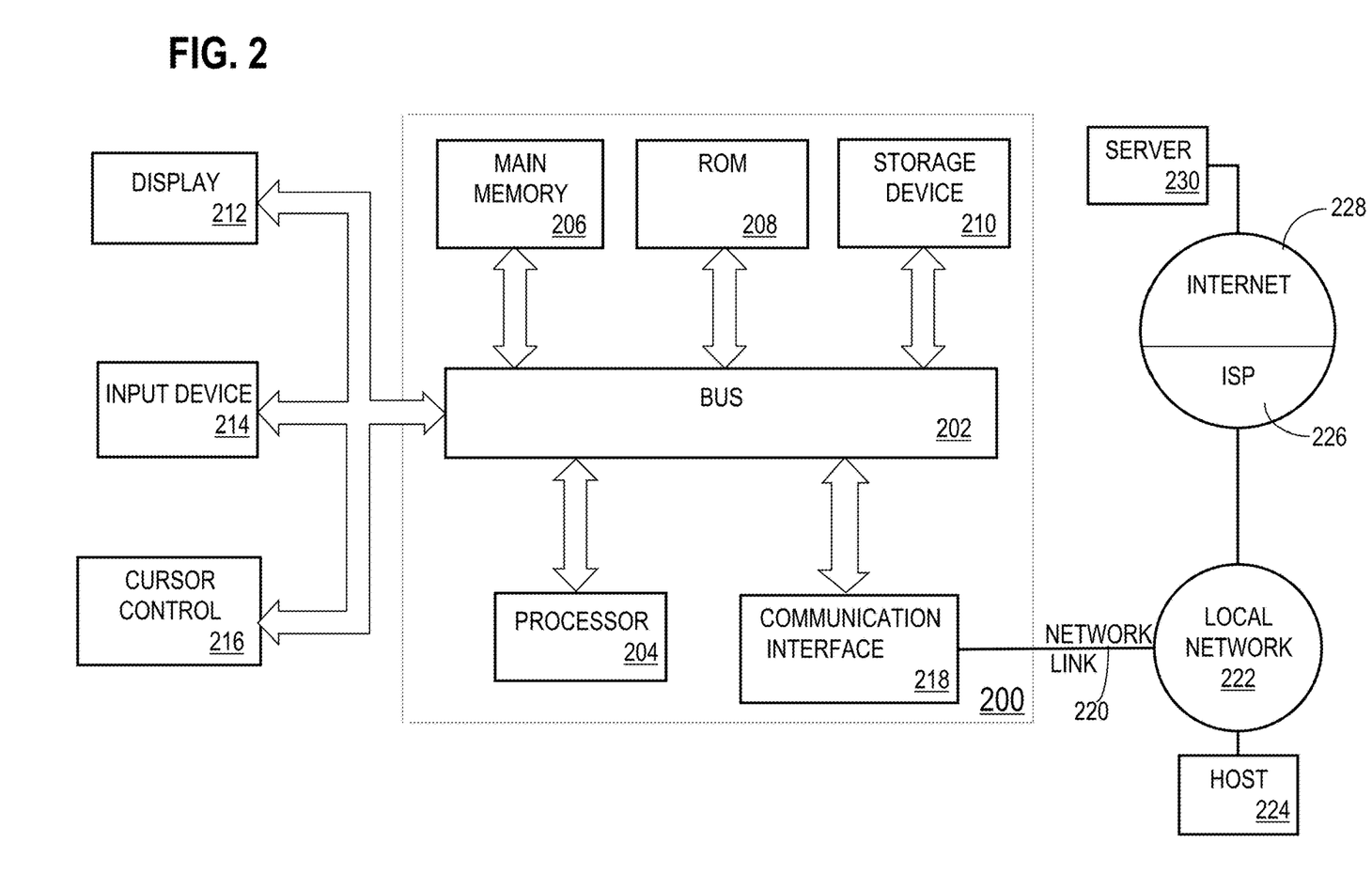
FIG. 2 is a block diagram that depicts an example computer system upon which embodiments may be implemented.

For example, FIG. 2 is a block diagram that illustrates a computer system 200 upon which an embodiment may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk, optical disk, or solid-state drive is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 210. Non-volatile media may also include persistent memory, such as MRAIVI or PCM, like 3DXPoint from Intel which can be used as a part of main memory. Volatile media includes dynamic memory, such as main memory 206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid-state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 930 might transmit a requested code for an application program through Internet 228, ISP 226, local network 222 and communication interface 218.

The received code may be executed by processor 204 as it is received, and/or stored in storage device 210, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method of migrating a namespace from a source system to a target system, comprising:
during a pre-migration phase, causing:
requests to read blocks from the namespace, issued from source-based guests, to be directed to the source system, wherein the source-based guests are guests executing on hosts that belong to the source system; and
requests to read blocks from the namespace, issued from target-based guests, to be directed to the target system, and if the blocks are not in the target system, to be directed to the source system, wherein the target-based guests are guests executing on hosts that belong to the target system;
requests to write blocks to the namespace, issued from either source-based guests or target-based guests, to be directed to the source system;
transitioning from the pre-migration phase to a home-change phase by establishing the target system as the home system of the namespace;
during the home-change phase, causing:
requests to read blocks from the namespace, issued from source-based guests, to be directed to the source system, and if the blocks are not in the source system, to be directed to the target system;
requests to read blocks from the namespace, issued from target-based guests, to be directed to the target system, and if the blocks are not in the target system, to be directed to the source system; and
requests to write blocks to the namespace, issued from either source-based guests or target-based guests, to be directed to the target system.

2. The method of claim 1 wherein migrating the namespace includes migrating one or more source-based guests that use files in the namespace from the source system to the target system without restarting the one or more source-based guests.

3. The method of claim 1 further comprising, after the home-change phase, automatically shutting down one or more hosts that belong to the source system.

4. The method of claim 1 further comprising a migration orchestrator automatically performing one or more of:
adding hosts to the target system;
updating a replica at the target system with recent data;
migrating some guests from the source system to the target system;
migrating the namespace to the target system; or
shutting down the source system.

5. The method of claim 1 wherein:
both the source system and the target system are Content Addressable Storage (CAS) systems;
each block in the namespace has a fingerprint;
during the pre-migration phase, the source system locates requested blocks in the source system based on the fingerprints of the requested blocks using a source fingerprint index maintained by the source system; and
during the pre-migration phase, the target system determines whether requested blocks are present in the target system based on whether the fingerprints for the requested blocks are in a target fingerprint index maintained by the target system.

6. The method of claim 5 further comprising, prior to migrating the namespace to the target system, transferring a replica of namespace content of the namespace to the target system.

7. The method of claim 6 further comprising, during the pre-migration phase, in response to a request for a particular block from a particular target-based guest, obtaining the particular block from the replica in the target system based on the fingerprint of the block using the target fingerprint index.

8. The method of claim 1 further comprising:
executing a namespace directory that maintains namespace-to-system mapping information for each namespace of a plurality of namespaces; and
wherein establishing the target system as the home system of the namespace includes updating the namespace-to-system mapping maintained by the namespace directory for the namespace to indicate that the target system is a new home system for the namespace.

9. The method of claim 8 further comprising:
after the target system is established as the home system for the namespace, the source system receiving a remote request from a remote host to retrieve data from the namespace;
the source system responding to the remote request with an indication that the source system is no longer the home of the namespace;
in response to the indication, the remote system:
sending a message to the namespace directory to determine a current home of the namespace; and
sending a request to retrieve data from the namespace to the target system upon being informed that the target system is the home for the namespace.

10. The method of claim 1 wherein:
both the source system and the target system are Content Addressable Storage (CAS) systems;
each block in the namespace has a fingerprint;
the source system maintains a namespace structure that maps filenames to content handles;
the namespace structure is stored in the CAS system of the source system, and has a namespace content handle; and
transitioning from the pre-migration phase to the home-change phase includes communicating the namespace content handle to the target system.

11. The method of claim 10 wherein:
the name content handle communicated to the target system establishes a namespace snapshot; and
the method further comprises:
transitioning from the home-change phase to a post-migration phase when all namespace content addressed in the namespace snapshot is present in the target system;
during the post-migration phase, causing:
requests to read blocks from the namespace, issued from source-based guests, to be directed to the target system;
requests to read blocks from the namespace, issued from target-based guests, to be directed to the target system; and
requests to write blocks to the namespace, issued from either source-based guests or target-based guests, to be directed to the target system.

12. The method of claim 11 further comprising, after receiving the namespace content handle, the target system obtaining all blocks from the target system that are referenced, directly or indirectly by the namespace content handle, that are not already in the target system, wherein the target system uses fingerprints of the blocks, and the target fingerprint index, to determine which blocks are already in the target system.

13. The method of claim 11 further comprising causing the source system to retain all namespace content included in the namespace snapshot until all namespace content in the namespace snapshot is present in the target system.

14. The method of claim 11 further comprising:
marking a set of files in namespace in the source system as do-not-migrate; and
after receiving the namespace content handle, the target system obtaining all blocks from the target system that are referenced, directly or indirectly by the namespace content handle, that:
are not already in the target system; and
are not associated with files that are marked as do not migrate;
wherein the target system uses fingerprints of the blocks, and the target fingerprint index, to determine which blocks are already in the target system.

15. The method of claim 1 further comprising, responsive to migrating the namespace from the source system to the target system:
automatically assigning one or more spare host devices to the target system; and
migrating one or more guests from the source system to the one or more spare host devices.

16. The method of claim 15 further comprising, responsive to migrating the namespace from the target system back to the source system, migrating the one or more guests from the one or more spare host devices to the source system and ceasing to assign the one or more spare host devices to the target system.

17. One or more non-transitory computer-readable media of storing instructions for migrating a namespace from a source system to a target system, the instructions including instructions which, when executed by one or more computing devices, cause:
during a pre-migration phase, causing:
requests to read blocks from the namespace, issued from source-based guests, to be directed to the source system, wherein the source-based guests are guests executing on hosts that belong to the source system; and
requests to read blocks from the namespace, issued from target-based guests, to be directed to the target system, and if the blocks are not in the target system, to be directed to the source system, wherein the target-based guests are guests executing on hosts that belong to the target system;
requests to write blocks to the namespace, issued from either source-based guests or target-based guests, to be directed to the source system;
transitioning from the pre-migration phase to a home-change phase by establishing the target system as the home system of the namespace;
during the home-change phase, causing:
requests to read blocks from the namespace, issued from source-based guests, to be directed to the source system, and if the blocks are not in the source system, to be directed to the target system;
requests to read blocks from the namespace, issued from target-based guests, to be directed to the target system, and if the blocks are not in the target system, to be directed to the source system; and
requests to write blocks to the namespace, issued from either source-based guests or target-based guests, to be directed to the target system.

18. The one or more non-transitory computer-readable media of claim 17 wherein migrating the namespace includes migrating one or more source-based guests that use files in the namespace from the source system to the target system without restarting the one or more source-based guests.

19. The one or more non-transitory computer-readable media of claim 17 further comprising, after the home-change phase, automatically shutting down one or more hosts that belong to the source system.

20. The one or more non-transitory computer-readable media of claim 17 further comprising instructions that cause a migration orchestrator to automatically performing one or more of:
 adding hosts to the target system;
 updating a replica at the target system with recent data;
 migrating some guests from the source system to the target system;
 migrating the namespace to the target system; or
 shutting down the source system.

21. The one or more non-transitory computer-readable media of claim 17 wherein:
 both the source system and the target system are Content Addressable Storage (CAS) systems;
 each block in the namespace has a fingerprint;
 during the pre-migration phase, the source system locates requested blocks in the source system based on the fingerprints of the requested blocks using a source fingerprint index maintained by the source system; and
 during the pre-migration phase, the target system determines whether requested blocks are present in the target system based on whether the fingerprints for the requested blocks are in a target fingerprint index maintained by the target system.

22. The one or more non-transitory computer-readable media of claim 21 further comprising instructions for, prior to migrating the namespace to the target system, transferring a replica of namespace content of the namespace to the target system.

23. The one or more non-transitory computer-readable media of claim 22 further comprising instruction for, during the pre-migration phase, in response to a request for a particular block from a particular target-based guest, obtaining the particular block from the replica in the target system based on the fingerprint of the block using the target fingerprint index.

24. The one or more non-transitory computer-readable media of claim 17 further comprising instructions for:
 executing a namespace directory that maintains namespace-to-system mapping information for each namespace of a plurality of namespaces; and
 wherein establishing the target system as the home system of the namespace includes updating the namespace-to-system mapping maintained by the namespace directory for the namespace to indicate that the target system is a new home system for the namespace.

25. The one or more non-transitory computer-readable media of claim 24 further comprising instructions for:
 after the target system is established as the home system for the namespace, the source system receiving a remote request from a remote host to retrieve data from the namespace;
 the source system responding to the remote request with an indication that the source system is no longer the home of the namespace;
 in response to the indication, the remote system:
  sending a message to the namespace directory to determine a current home of the namespace; and
  sending a request to retrieve data from the namespace to the target system upon being informed that the target system is the home for the namespace.

26. The one or more non-transitory computer-readable media of claim 17 wherein:
 both the source system and the target system are Content Addressable Storage (CAS) systems;
 each block in the namespace has a fingerprint;
 the source system maintains a namespace structure that maps filenames to content handles;
 the namespace structure is stored in the CAS system of the source system, and has a namespace content handle; and
 transitioning from the pre-migration phase to the home-change phase includes communicating the namespace content handle to the target system.

27. The one or more non-transitory computer-readable media of claim 26 wherein:
 the name content handle communicated to the target system establishes a namespace snapshot; and
 the one or more non-transitory computer-readable media further comprises:
  transitioning from the home-change phase to a post-migration phase when all namespace content addressed in the namespace snapshot is present in the target system;
  during the post-migration phase, causing:
   requests to read blocks from the namespace, issued from source-based guests, to be directed to the target system;
   requests to read blocks from the namespace, issued from target-based guests, to be directed to the target system; and
   requests to write blocks to the namespace, issued from either source-based guests or target-based guests, to be directed to the target system.

28. The one or more non-transitory computer-readable media of claim 27 further comprising instructions for, after receiving the namespace content handle, the target system obtaining all blocks from the target system that are referenced, directly or indirectly by the namespace content handle, that are not already in the target system, wherein the target system uses fingerprints of the blocks, and the target fingerprint index, to determine which blocks are already in the target system.

29. The one or more non-transitory computer-readable media of claim 27 further comprising instructions for causing the source system to retain all namespace content included in the namespace snapshot until all namespace content in the namespace snapshot is present in the target system.

30. The one or more non-transitory computer-readable media of claim 27 further comprising instructions for:
 marking a set of files in namespace in the source system as do-not-migrate; and after receiving the namespace content handle, the target system obtaining all blocks from the target system that are referenced, directly or indirectly by the namespace content handle, that:
are not already in the target system; and
are not associated with files that are marked as do not migrate;
wherein the target system uses fingerprints of the blocks, and the target fingerprint index, to determine which blocks are already in the target system.

31. The one or more non-transitory computer-readable media of claim 17 further comprising instructions for, responsive to migrating the namespace from the source system to the target system:
automatically assigning one or more spare host devices to the target system; and
migrating one or more guests from the source system to the one or more spare host devices.

32. The one or more non-transitory computer-readable media of claim 31 further comprising instructions for, responsive to migrating the namespace from the target system back to the source system, migrating the one or more guests from the one or more spare host devices to the source system and ceasing to assign the one or more spare host devices to the target system.

* * * * *